United States Patent
Neal et al.

(10) Patent No.: US 9,051,652 B2
(45) Date of Patent: Jun. 9, 2015

(54) ARTICLE HAVING THERMAL BARRIER COATING

(75) Inventors: James W. Neal, Ellington, CT (US); Michael J. Maloney, Marlborough, CT (US); Benjamin Joseph Zimmerman, Enfield, CT (US); Christopher Masucci, Coventry, CT (US); David A. Litton, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 842 days.

(21) Appl. No.: 12/631,957

(22) Filed: Dec. 7, 2009

(65) Prior Publication Data

US 2011/0135895 A1 Jun. 9, 2011

(51) Int. Cl.

| | |
|---|---|
| *B32B 3/00* | (2006.01) |
| *B32B 7/02* | (2006.01) |
| *B32B 9/00* | (2006.01) |
| *B32B 19/00* | (2006.01) |
| *C23C 28/00* | (2006.01) |
| *C04B 41/52* | (2006.01) |
| *C04B 41/50* | (2006.01) |
| *C23C 28/04* | (2006.01) |

(52) U.S. Cl.
CPC ........... *C23C 28/00* (2013.01); *Y10T 428/2495* (2015.01); *C04B 41/524* (2013.01); *C04B 41/5044* (2013.01); *C04B 41/5042* (2013.01); *C23C 28/04* (2013.01)

(58) Field of Classification Search
CPC .. C23C 28/00; C23C 28/04; Y10T 428/2495; C04B 41/5044; C04B 41/5042; C04B 41/524; C04B 41/52

USPC ................... 428/156, 213, 699, 701
See application file for complete search history.

(56) References Cited

U.S. PATENT DOCUMENTS

| | | | |
|---|---|---|---|
| 6,177,200 B1 | 1/2001 | Maloney | |
| 6,187,453 B1 | 2/2001 | Maloney | |
| 6,258,467 B1 | 7/2001 | Subramanian | |
| 6,333,118 B1 * | 12/2001 | Alperine et al. | 428/469 |

(Continued)

FOREIGN PATENT DOCUMENTS

| | | |
|---|---|---|
| DE | 102006027728 | 12/2007 |
| EP | 825271 | 2/1998 |

(Continued)

OTHER PUBLICATIONS

EP Search Report for EP10251995.6 dated Jan. 18, 2011.

*Primary Examiner* — Jonathan Langman
(74) *Attorney, Agent, or Firm* — Carlson, Gaskey & Olds, P.C.

(57) ABSTRACT

An article includes a metallic substrate and a tri-layer thermal barrier coating that is deposited on the metallic substrate. The tri-layer thermal barrier coating includes an inner ceramic layer, an outermost ceramic layer relative to the metallic substrate, and an intermediate ceramic layer between the inner ceramic layer and the outermost ceramic layer. The inner ceramic layer and the outermost ceramic layer are composed of respective first and second ceramic materials and the intermediate ceramic layers composed of a third, different ceramic material. The inner ceramic layer has a first thickness, the outermost ceramic layer has a second thickness, and the intermediate ceramic layer has a third thickness that is greater than the first thickness and the second thickness.

18 Claims, 1 Drawing Sheet

(56) References Cited

U.S. PATENT DOCUMENTS

| | | |
|---|---|---|
| 6,482,537 B1 | 11/2002 | Strangman et al. |
| 7,326,470 B2 | 2/2008 | Ulion et al. |
| 7,374,825 B2 * | 5/2008 | Hazel et al. .................. 428/632 |
| 2003/0049470 A1 | 3/2003 | Maloney |
| 2003/0054108 A1 * | 3/2003 | Beele ....................... 427/376.2 |
| 2004/0038086 A1 | 2/2004 | Litton et al. |
| 2005/0129972 A1 * | 6/2005 | Matsumoto et al. ......... 428/632 |
| 2005/0170200 A1 | 8/2005 | Nagaraj et al. |
| 2007/0292624 A1 | 12/2007 | Nagaraj et al. |
| 2008/0187659 A1 * | 8/2008 | Spitsberg et al. .......... 427/248.1 |
| 2009/0169914 A1 | 7/2009 | Fu et al. |
| 2009/0297876 A1 * | 12/2009 | Schneiderbanger et al. . 428/623 |

FOREIGN PATENT DOCUMENTS

| | | | |
|---|---|---|---|
| EP | 1400610 | 3/2004 | |
| EP | 1621646 | 2/2006 | |
| EP | 1806434 | 7/2007 | |
| EP | 1889940 | 2/2008 | |
| JP | 2003201586 | 7/2003 | |
| RU | 2116377 | 6/1996 | |
| WO | 2002014580 | 2/2002 | |
| WO | WO/2007/143973 | * 6/2007 | ............. C23C 28/00 |

* cited by examiner

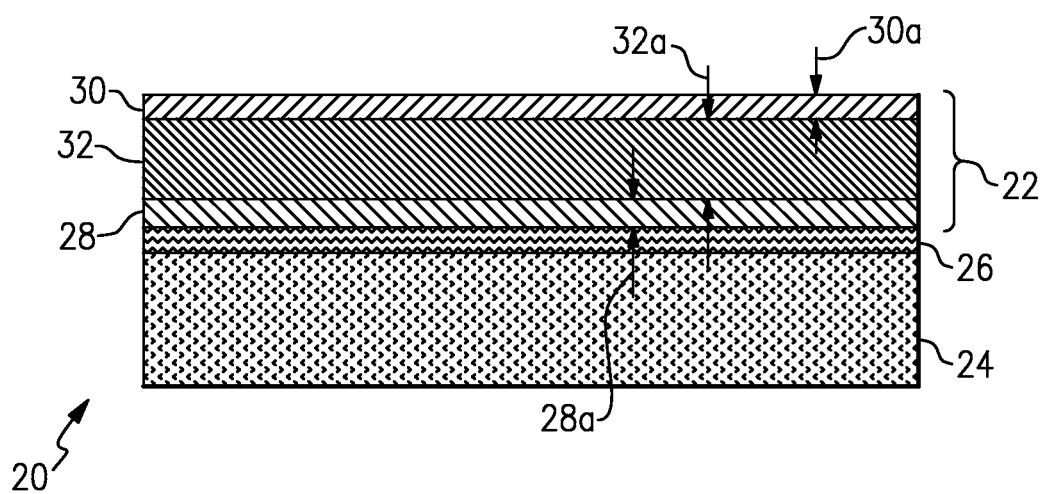

ARTICLE HAVING THERMAL BARRIER COATING

BACKGROUND

This disclosure relates to coatings and, more particularly, to a multi-layer spallation-resistant thermal barrier ceramic coating.

Turbine engine components such as airfoils and other articles typically operate in harsh environments. For instance, an airfoil may operate under high temperatures, corrosive conditions, and a variety of different stresses. The article may include a ceramic coating for protection against the environmental conditions.

SUMMARY

An exemplary article includes a metallic substrate and a tri-layer thermal barrier coating that is deposited on the metallic substrate. The tri-layer thermal barrier coating includes an inner ceramic layer, an outermost ceramic layer relative to the metallic substrate, and an intermediate ceramic layer between the inner ceramic layer and the outermost ceramic layer. The inner ceramic layer and the outermost ceramic layer are respectively composed of first and second ceramic materials and the intermediate ceramic layer is composed of a third, different ceramic material. The inner ceramic layer has a first thickness, the outermost ceramic layer has a second thickness, and the intermediate layer has a third thickness that is greater than the first thickness and the second thickness.

An example method of processing an article includes forming the tri-layer thermal barrier coating on the metallic substrate such that the inner ceramic layer is formed with a first thickness, the outermost ceramic layer is formed with a second thickness, and the intermediate ceramic layer is formed with a third thickness that is greater than the first thickness and the second thickness.

BRIEF DESCRIPTION OF THE DRAWING

The various features and advantages of the disclosed examples will become apparent to those skilled in the art from the following detailed description. The drawings that accompany the detailed description can be briefly described as follows.

FIG. 1 illustrates an example article having a thermal barrier coating.

DETAILED DESCRIPTION OF THE PREFERRED EMBODIMENT

FIG. 1 illustrates an example article 20 having a thermal barrier coating 22 for protecting in an underlying metallic substrate 24 in a high temperature environment. The article 20 may be any type of article that would benefit from having the thermal barrier coating 22, such as a turbine engine component (e.g., airfoil) for use within a gas turbine engine. As will be described, the example thermal barrier coating 22 includes a multi-layer construction with layers formed within predetermined thickness ranges for enhancing spall-resistance and thereby extending the life of the article 20.

The metallic substrate 24 may be formed of a superalloy material, such as a nickel-based alloy. In some examples, the superalloy may be a nickel-cobalt-based alloy. Given this description, one of ordinary skill in the art will recognize other types of alloys to suit their particular needs.

The thermal barrier coating 22 is deposited on the metallic substrate 24 to protect the metallic substrate 24 from a high temperature environment, such as a hot gas flow within a gas turbine engine.

Optionally, a bond coat 26 may be deposited between the thermal bather coating 22 and the metallic substrate 24 to facilitate bonding the thermal barrier coating 22 to the metallic substrate 24. The bond coat 26 may be any suitable type of bond coat that facilitates bonding. As an example, the bond coat 26 may be a metal-chromium-aluminum-yttrium layer ("MCrAlY"), or an aluminide or platinum aluminide or a lower-aluminum gamma/gamma prime-type coating. The bond coat 26 may further include a thermally grown oxide (not shown) for further enhancing bonding between the layers.

The thermal barrier coating 22 may be a tri-layer construction that includes an inner ceramic layer 28, an outermost ceramic layer 30 relative to the metallic substrate 24, and an intermediate ceramic layer 32 (collectively "the layers") between the inner ceramic layer 28 and the outermost ceramic layer 30. In the illustrated embodiment, the thermal barrier coating 22 includes only the three layers, however, other examples may include additional layers.

The ceramic materials of the layers 28, 30, and 32 may be ceramic materials having at least one element or material selected from lanthanide elements, scandium, indium, yttrium, molybdenum, carbon, magnesium, and rare earth oxides.

In some examples, the inner ceramic layer 28 and the outermost ceramic layer 30 may be formed from a zirconia solid solution or compound having good fracture toughness, such as yttria-zirconia solid solutions or compounds. The ceramic material of the intermediate ceramic layer 32 may be formed of a zirconia or hafnia solid solution or compound having a lower thermal conductivity relative to the ceramic materials of the inner ceramic layer 28 and the outermost ceramic layer 30. A few examples include gadolinia-zirconia, gadolinia-hafnia, or other solid solutions or compounds based on zirconium or hafnium, such as those including lanthanide elements, scandium, indium, yttrium, molybdenum, carbon, magnesium, or rare earth oxides. Another example for a lower thermal conductivity material would be gadolinium zirconate or hafnium zirconate. The intermediate ceramic layer 32 provides the thermal barrier coating 22 with thermal resistance, the inner ceramic layer 28 provides the thermal barrier coating 22 with higher toughness and adhesion to the bond coat 26, and the outermost ceramic layer 30 provides the thermal barrier coating 22 with resistance to erosion from impact of particles that may impinge upon the surface of the article 20.

In a further example, the yttria-zirconia solid solution or compound may include about 1-20 wt. % yttria and, for instance, may include 7 wt. % yttria. The gadolinia-zirconia may include about 59 wt. % gadolinia. In this case, yttria-zirconia has a higher fracture toughness than gadolinia-zirconia, and gadolinia-zirconia has a lower thermal conductivity than yttria-zirconia.

The inner ceramic layer 28 includes a thickness 28a, the outermost ceramic layer 30 includes a thickness 30a, and the intermediate ceramic layer 32 includes a thickness 32a. The thickness 32a of the intermediate ceramic layer 32 is greater than the thickness 28a of the inner ceramic layer 28 and the thickness 30a of the outermost ceramic layer 30. That is, the thickness 32a is greater than either of the thicknesses 28a or 30a. As will be described, the thicknesses 28a, 30a, and 32a of the layers 28, 30, and 32 are within predetermined thickness ranges to facilitate enhancing spallation-resistance of the thermal barrier coating 22 due to high temperatures, erosion, particle impact, and the like.

In some examples, the thickness 28a and thickness 30a may each be 0.5-2.0 mils (approximately 0.13-0.05 millimeters) and the thickness 32a may be 1-20 mils (approximately 0.025-0.5 millimeters). In a further example, the thicknesses 28a and 30a may each be 1.1-1.9 (approximately 0.028-0.048 millimeters) and the thickness 32a may be 5-7 mils (approximately 0.127-0.203 millimeters). Further, the thicknesses 28a and 30a may be approximately 1.5 mils (approximately 0.038 millimeters) and the thickness 32a may be approximately 6 mils (approximately 0.152 millimeters).

In other examples, the desirable thicknesses may be represented by ratios of the thicknesses 28a, 30a, and 32a. As an example, a ratio of the thickness 32a to the combined thickness of 28a and 30a may be 1-4. In a further example, the ratio may be 1.3-3.2, and in a further example, the ratio may be 1.8-2.3 to provide the thermal barrier coating 22 with a high degree of spallation-resistance. One premise of this disclosure is that the given example thickness ranges or ratios in combination with the disclosed ceramic materials provide a synergy that results in an increase in spallation-resistance beyond what would be predicted from the individual layers. In some examples, the life of the thermal barrier coating 22 may thereby be 150% or greater than traditional ceramic barrier coatings.

In a further example, the surface of the bond coat 26 may be treated prior to deposition of the thermal barrier coating 22 (e.g., in a columnar structure) to enhance bonding. As an example, the surface may be treated to achieve a surface roughness $R_z$ that is less than about 0.17 mils (approximately 0.00432 millimeters). The surface roughness $R_z$ is an average of surface heights over unit lengths of the bond coat 26, where each of the surface heights extends between a highest surface peak and a lowest surface valley within one of the unit lengths. For instance, surface roughness $R_z$ may be determined using contact or non-contact methods. One example of establishing the surface roughness $R_z$ can be found in co-pending and commonly owned application Ser. No. 12/257,581.

The layers 28, 30, and 32 of the thermal barrier coating 22 may be formed with the thicknesses 28a, 30a, and 32a in the disclosed ranges using physical vapor deposition processing. As an example, known equipment may be used to deposit the layers 28, 30, and 32 using an electron beam physical vapor deposition ("EBPVD") process or an electron beam directed vapor deposition ("EBDVD") process. It is also possible to apply such coatings by other methods such as thermal spray.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An article comprising:
a metallic substrate; and
a tri-layer thermal barrier coating deposited on the metallic substrate, the tri-layer thermal barrier coating consisting of an inner ceramic layer, an outermost ceramic layer relative to the metallic substrate, and an intermediate ceramic layer between the inner ceramic layer and the outermost ceramic layer, the outermost ceramic layer including a free, first surface and an opposite, second surface adjacent the intermediate ceramic layer, the inner ceramic layer and the outermost ceramic layer being respectively composed of first and second ceramic materials and the intermediate ceramic layer being composed of a third, different ceramic material selected from the group consisting of hafnia with molybdenum, hafnia with carbon, and combinations thereof, the inner ceramic layer having a first thickness, the outermost ceramic layer having a second thickness, and the intermediate ceramic layer having a third thickness that is greater than the first thickness and the second thickness.

2. The article as recited in claim 1, wherein the first and second ceramic materials are yttria-zirconia solid solutions or compounds.

3. The article as recited in claim 1, wherein each of the first thickness and the second thickness is 0.5-2.0 mils and the third thickness is 1-20 mils.

4. The article as recited in claim 3, wherein each of the first thickness and the second thickness is 1.1-1.9 mils and the third thickness is 5-7 mils.

5. The article as recited in claim 4, wherein each of the first thickness and the second thickness is about 1.5 mils and the third thickness is about 6 mils.

6. The article as recited in claim 1, including a ratio of the third thickness to a combined thickness of the first thickness and the second thickness, and the ratio is 1-4.

7. The article as recited in claim 6, wherein the ratio is 1.3-3.2.

8. The article as recited in claim 7, wherein the ratio is 1.8-2.3.

9. The article as recited in claim 1, further comprising a bond coat between the metallic substrate and the tri-layer thermal barrier coating, and the bond coat has a surface roughness $R_z$ that is less than 0.17 mils.

10. The article as recited in claim 1, wherein the article consists of the metallic substrate, the tri-layer thermal barrier coating and a bond coat between the metallic substrate and the tri-layer thermal barrier coating.

11. The article as recited in claim 1, wherein the third ceramic material is hafnia with molybdenum.

12. The article as recited in claim 1, wherein the third ceramic material is hafnia with carbon.

13. An article comprising:
a metallic substrate; and
a tri-layer thermal barrier coating deposited on the metallic substrate, the tri-layer thermal barrier coating including an inner ceramic layer, and an outermost ceramic layer relative to the metallic substrate, an intermediate ceramic layer between the inner ceramic layer and the outermost ceramic layer, the outermost ceramic layer including a free, first surface and an opposite, second surface adjacent the intermediate ceramic layer, the inner ceramic layer and the outermost ceramic layer being respectively composed of first and second ceramic materials and the intermediate ceramic layer being composed of a third, different ceramic material selected from the group consisting of hafnia with molybdenum, hafnia with carbon, and combinations thereof, the inner ceramic layer having a first thickness, the outermost ceramic layer having a second thickness, and the intermediate ceramic layer having a third thickness that is greater than the first thickness and the second thickness.

14. The article as recited in claim 13, wherein each of the first ceramic material and the second ceramic material is yttria stabilized zirconia, and a ratio of the third thickness to a combined thickness of the first thickness and the second thickness is 1-4.

15. The article as recited in claim 14, wherein the ratio is 1.3-3.2.

16. The article as recited in claim 15, wherein the ratio is 1.8-2.3.

17. The article as recited in claim 13, wherein the third ceramic material is hafnia with molybdenum.

18. The article as recited in claim 13, wherein the third ceramic material is hafnia with carbon.

\* \* \* \* \*